United States Patent

Seo et al.

(10) Patent No.: US 9,857,634 B2
(45) Date of Patent: Jan. 2, 2018

(54) LIQUID CRYSTAL PHOTOALIGNMENT AGENT, LIQUID CRYSTAL DISPLAY INCLUDING THE SAME, AND METHOD OF MANUFACTURING THE SAME

(71) Applicant: Samsung Display Co., Ltd., Yongin, Gyeonggi-Do (KR)

(72) Inventors: Bong Sung Seo, Suwon-si (KR); Suk Hoon Kang, Seoul (KR); Baek Kyun Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 517 days.

(21) Appl. No.: 14/480,775

(22) Filed: Sep. 9, 2014

(65) Prior Publication Data

US 2015/0268514 A1 Sep. 24, 2015

(30) Foreign Application Priority Data

Mar. 18, 2014 (KR) ........................ 10-2014-0031843

(51) Int. Cl.
*G02F 1/1337* (2006.01)
*C08G 73/10* (2006.01)
(Continued)

(52) U.S. Cl.
CPC ..... *G02F 1/133788* (2013.01); *C08G 73/105* (2013.01); *C08G 73/1042* (2013.01);
(Continued)

(58) Field of Classification Search
CPC .............. C08G 73/1042; C08G 73/105; C08G 73/1078; C09D 179/08; G02F 1/133723;
(Continued)

(56) References Cited

U.S. PATENT DOCUMENTS 6,063,829 A 5/2000 Endou et al.
2011/0109855 A1 5/2011 Kilickiran et al.
(Continued)

FOREIGN PATENT DOCUMENTS

KR 1020080090680 A 10/2008
WO 2011115080 A1 9/2011

*Primary Examiner* — Sophie Hon
(74) *Attorney, Agent, or Firm* — Cantor Colburn LLP

(57) ABSTRACT

A liquid crystal display includes a first substrate, a thin film transistor positioned on the first substrate, a first electrode connected to the thin film transistor, a second substrate facing the first substrate, a first alignment layer positioned on the first electrode and a second alignment layer positioned on the second substrate, and a liquid crystal layer positioned between the first substrate and the second substrate and including a liquid crystal molecule. At least one of the first alignment layer and the second alignment layer includes a copolymer of cyclobutanedianhydride (CBDA), a diamine, and a compound represented by Chemical Formula 2.

Chemical Formula 2

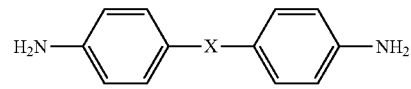

In which X of Chemical Formula 2 represents —$(CH_2)_m$—O—$(CH_2)_n$—, and a sum of m and n is an odd number.

11 Claims, 9 Drawing Sheets

(51) Int. Cl.
*C09D 179/08* (2006.01)
*G02F 1/1343* (2006.01)

(52) U.S. Cl.
CPC ....... *C08G 73/1078* (2013.01); *C09D 179/08* (2013.01); *G02F 1/133723* (2013.01); *G02F 1/134363* (2013.01); *Y10T 428/1023* (2015.01)

(58) Field of Classification Search
CPC ......... G02F 1/133788; G02F 1/134363; Y10T 429/1023; Y10T 428/1023
See application file for complete search history.

(56) References Cited

U.S. PATENT DOCUMENTS

| | | | | |
|---|---|---|---|---|
| 2011/0221984 | A1* | 9/2011 | Matsumori | ....... G02F 1/133723 349/33 |
| 2012/0300162 | A1* | 11/2012 | Uchino | ............ G02F 1/133788 349/123 |
| 2013/0063688 | A1 | 3/2013 | Kang et al. | |

* cited by examiner

LIQUID CRYSTAL PHOTOALIGNMENT AGENT, LIQUID CRYSTAL DISPLAY INCLUDING THE SAME, AND METHOD OF MANUFACTURING THE SAME

This application claims priority to Korean Patent Application No. 10-2014-0031843 filed on Mar. 18, 2014, and all the benefits accruing therefrom under 35 U.S.C. §119, the content of which is its entirety is herein incorporated by reference.

BACKGROUND (a) Field

The present invention relates to a liquid crystal photoalignment agent, a liquid crystal display including the same, and a method of manufacturing the same, and particularly, to a photoalignment agent having excellent anisotropy and decomposition efficiency, a liquid crystal display including the same, and a method of manufacturing the same.

(b) Description of the Related Art

In order to implement an image by a liquid crystal diode, that is, in order to switch liquid crystals by an external electric field between transparent conductive glasses, the liquid crystals are typically aligned in a predetermined direction at an interface between the liquid crystals and a transparent conductive glass electrode. The degree of uniformity of alignment of the liquid crystals is an important factor determining excellence of an image quality of a liquid crystal display.

Examples of a known general method of aligning the liquid crystals include a rubbing method in which a polymer layer such as polyimide is applied on a substrate such as glass and a surface is rubbed in a predetermined direction using fibers such as nylon or polyester. However, in the rubbing method, when the fibers and the polymer layer are rubbed, fine dust or static electricity may occur, which may cause a serious problem when a liquid crystal panel is manufactured.

In order to solve the aforementioned problem, a photoalignment method where anisotropy is induced to the polymer layer by irradiation of light and the liquid crystals are arranged by using anisotropy has been researched.

SUMMARY

The present invention has discovered in an effort to provide a liquid crystal photoalignment agent having excellent anisotropy and decomposition efficiency, and to improve an afterimage by mixing and using the liquid crystal photoalignment agent and a compound having a flexible structure. A liquid crystal photoalignment agent, a liquid crystal display including the liquid crystal photoalignment agent, and a method of manufacturing the liquid crystal photoalignment agent are provided herein.

An exemplary embodiment provides a liquid crystal display including: a first substrate, a thin film transistor positioned on the first substrate, a first electrode connected to the thin film transistor, a second substrate facing the first substrate, a first alignment layer positioned on the first electrode and a second alignment layer positioned on the second substrate, and a liquid crystal layer positioned between the first substrate and the second substrate and including a liquid crystal molecule, in at least one of the first alignment layer and the second alignment layer includes a liquid crystal photoalignment agent which includes a copolymer of cyclobutanedianhydride ("CBDA"), a diamine, and a compound represented by Chemical Formula 2.

Chemical Formula 2

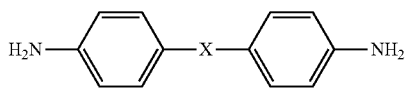

In Chemical Formula 2, X represents —(CH2)m-O—(CH$_2$)$_n$—, and a sum of m and n is an odd number.

The liquid crystal display further includes a second electrode on the first substrate, and an insulating layer positioned between the first electrode and the second electrode, in which the first electrode includes a plurality of branch electrodes, and the second electrode has a planar shape.

The liquid crystal display further includes a passivation layer positioned between the thin film transistor and the second electrode, in which the thin film transistor and the first electrode are connected by a contact hole defined in the passivation layer and the insulating layer.

The first alignment layer and the second alignment layer are formed of the same material.

Another exemplary embodiment provides a method of manufacturing a liquid crystal display, including: forming a thin film transistor on a first substrate, forming a passivation layer on the thin film transistor, forming a first electrode and a second electrode on the passivation layer with an insulating layer positioned between the first electrode and the second electrode, applying a liquid crystal photoalignment agent on the first electrode or the second electrode, baking the applied photoalignment agent, and irradiating polarized light on the photoalignment agent to form a first alignment layer, where the liquid crystal photoalignment agent includes a copolymer formed by polymerizing cyclobutanedianhydride, a diamine and a compound represented by Chemical Formula 2.

[Chemical Formula 2]

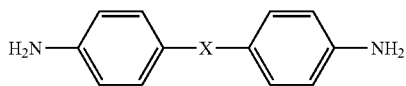

X of Chemical Formula 2 represents —(CH2)m-O—(CH$_2$)$_n$—, and a sum of m and n is an odd number.

The method further includes applying the liquid crystal photoalignment agent on a second substrate facing the first substrate, baking the applied liquid crystal photoalignment agent applied on the second substrate, and irradiating the liquid crystal photoalignment agent on the second substrate with polarized light to form a second alignment layer.

The method further includes baking the photoalignment agent after irradiating the liquid crystal photoalignment agent.

In another exemplary embodiment a liquid crystal photoalignment agent includes a copolymer of cyclobutanedianhydride (CBDA), a diamine, and a compound represented by Chemical Formula 2.

Chemical Formula 2

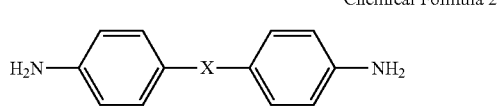

X of Chemical Formula 2 is constituted by —(CH2)m-O—(CH$_2$)$_n$—, and a sum of m and n is an odd number.

The diamine includes at least one of p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenylether, 2,2'-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxyl)phenyl]propane, 2,2-bis(4-aminophenyl)hexafluoropropane, and 2,2-bis[4-(4-aminophenoxy)phenyl]hexafluoropropane, bis(4-aminocyclohexyl)methane, bis(4-amino-3-methylcyclohexyl)methane, tetramethylenediamine, and hexamethylenediamine.

The cyclobutanedianhydride is represented by Chemical Formula 1, and the diamine is p-phenylenediamine represented by Chemical Formula 5.

Chemical Formula 1

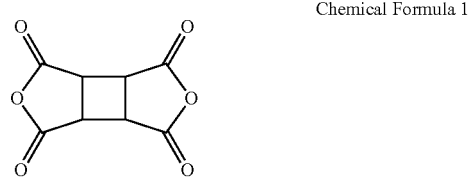 [SMILES: O=C1OC(=O)C2C1C1C(=O)OC(=O)C21]

Chemical Formula 5

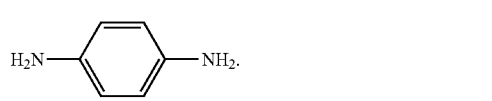

In the liquid crystal photoalignment agent, the copolymer includes repeating units represented by Chemical Formula 3 and Chemical Formula 4, and the repeating units are randomly repeated in the copolymer.

Chemical Formula 3

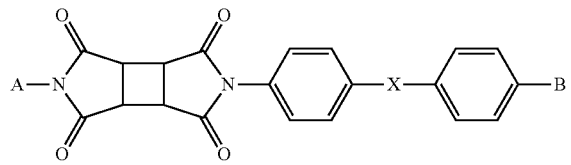

Chemical Formula 4

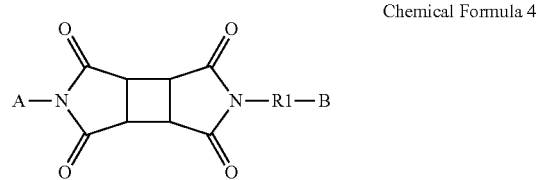

X represents —(CH2)m-O—(CH$_2$)$_n$—, A and B represent Chemical Formula 3 or Chemical Formula 4, and R1 is a core structure bonded to two amino groups (—NH$_2$) of the diamine.

In X of Chemical Formula 2, a sum of m and n is an odd number.

In X of Chemical Formula 2, the number of carbon (C) atoms is 1 to 10.

In X of Chemical Formula 2, m is 3 and n is 2.

The compound of Chemical Formula 2 is included in an amount of about 1% to about 50% based on a total weight of the liquid crystal photoalignment agent.

According to the exemplary embodiments, the anisotropy and decomposition efficiency of the liquid crystal photoalignment agent are excellent and thus an afterimage can be improved by mixing and using the liquid crystal photoalignment agent and a compound having a flexible structure.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
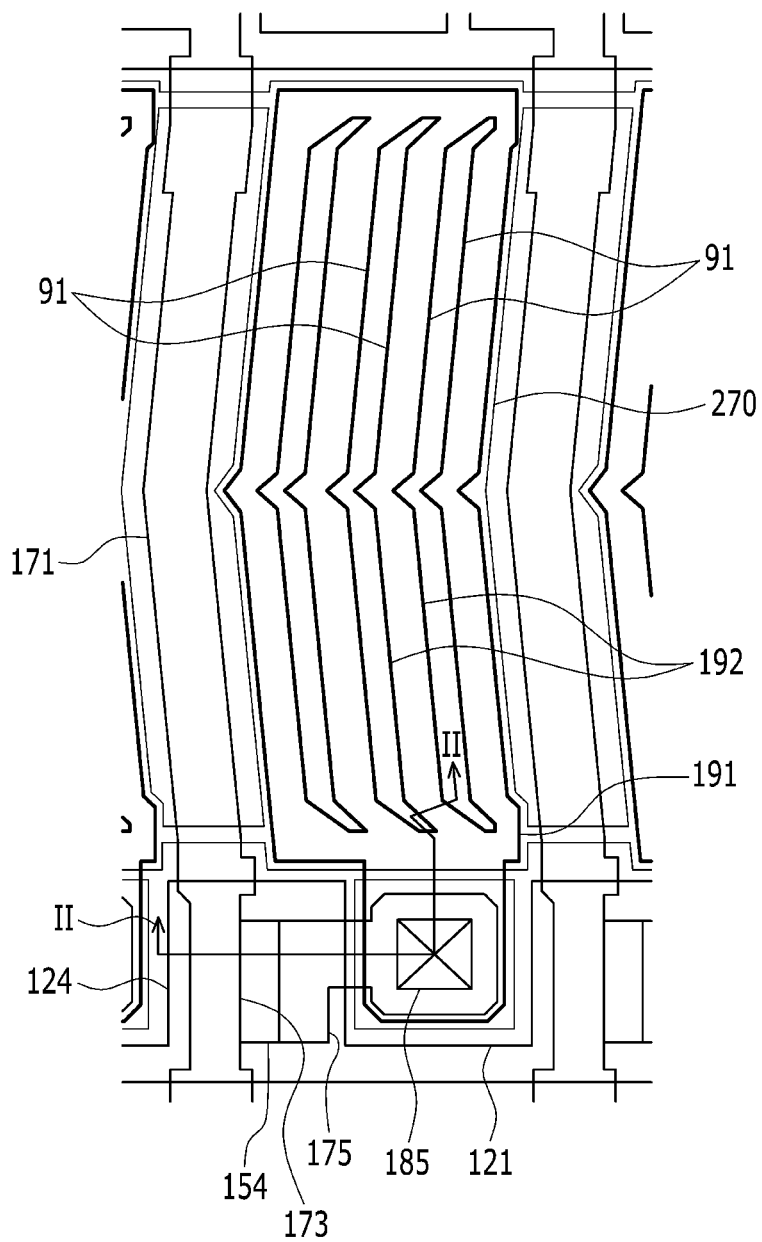
FIG. 1 is a top plan view illustrating an exemplary embodiment of a liquid crystal display.

The present invention will be described more fully hereinafter with reference to the accompanying drawings, in which various embodiments of the invention are shown. As those skilled in the art would realize, the described embodiments may be modified in various different ways, all without departing from the spirit or scope of the present invention. Rather, these embodiments are provided so that this disclosure will be thorough and complete, and will fully convey the scope of the invention to those skilled in the art. Like reference numerals refer to like elements throughout.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A photoalignment method where anisotropy is induced to the polymer layer by irradiation of light and the liquid crystals are arranged by using anisotropy has been researched. The material for the photoalignment method may include polymers containing a photofunctional group such as azobenzene, cumarin, imide, chalcone, and cinnamate, and in the polymers, a reaction such as photoisomerization, photocrosslinking, and photodecomposition anisotropically occurs by irradiation of polarized light, and thus anisotropy is caused on the surface of the polymer to arrange the liquid crystals in one direction.

An exemplary embodiment of a liquid crystal display is described in detail with reference to FIGS. 1 and 2.

Figure 2:
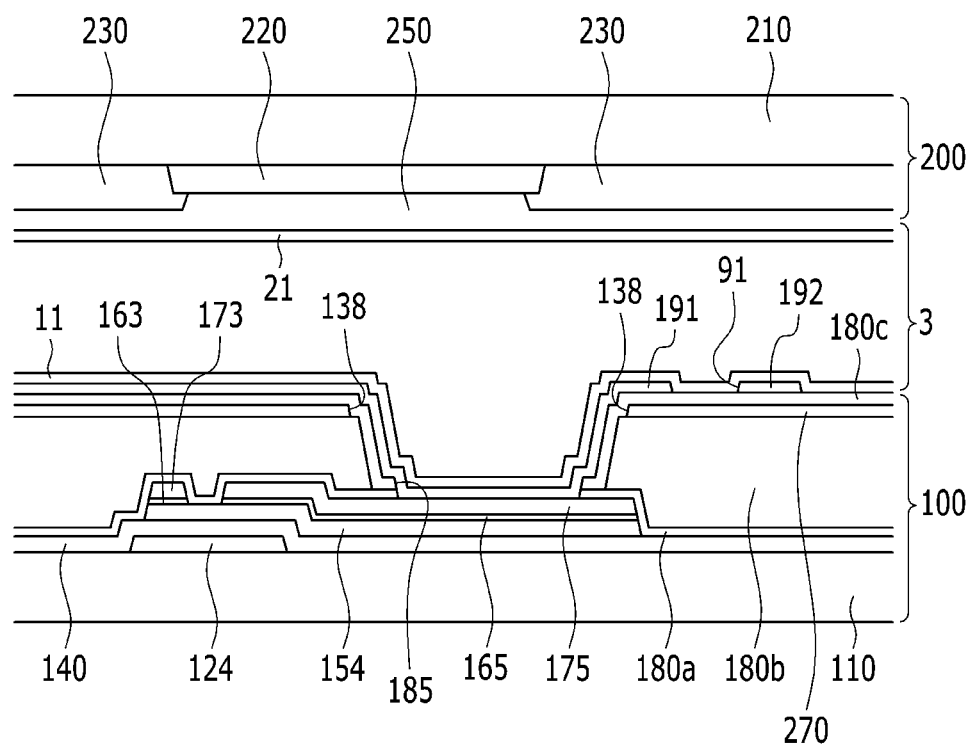
FIG. 2 is a cross-sectional view taken along cut line II-II of FIG. 1.

FIG. 1 is a top plan view illustrating an exemplary embodiment of a liquid crystal display according, and FIG. 2 is a cross-sectional view taken along cut line II-II of FIG. 1.

Referring to FIGS. 1 and 2, the exemplary liquid crystal display includes a lower display panel 100 and an upper display panel 200 facing each other, and a liquid crystal layer 3 injected therebetween.

First, the lower display panel 100 will be described.

A gate conductor including a gate line 121 is formed on a first substrate 110 formed of transparent glass, plastic, or the like.

The gate line 121 includes a gate electrode 124, and a wide end portion (not illustrated) for connection with another layer or an external driving circuit. The gate line 121 may be made of (e.g., include) an aluminum-based metal such as aluminum (Al) or an aluminum alloy, a silver-based metal such as silver (Ag) or an silver alloy, a copper-based metal such as copper (Cu) or a copper alloy, a molybdenum-based metal such as molybdenum (Mo) or a molybdenum alloy, chromium (Cr), tantalum (Ta), and titanium (Ti). However, the gate line 121 may have a multilayered structure including at least two conductive layers having different physical properties.

A gate insulating layer 140 formed of silicon nitride (SiNx), silicon oxide (SiOx), or the like is formed on the gate line 121. The gate insulating layer 140 may have a multilayered structure including at least two insulating layers having different physical properties.

A semiconductor layer 154 made of amorphous silicon, polysilicon, or the like is positioned on the gate insulating layer 140. The semiconductor layer 154 may include an oxide semiconductor.

Ohmic contacts 163 and 165 are formed on the semiconductor layer 154. The ohmic contacts 163 and 165 may be made of a material such as n+ hydrogenated amorphous silicon with which an n-type impurity such as phosphorus is doped at a high concentration, or silicide. The ohmic contacts 163 and 165 may form a pair to be disposed on the semiconductor layer 154. In the case where the semiconductor 154 is an oxide semiconductor, the ohmic contacts 163 and 165 can be omitted.

A data conductor including a data line 171 including a source electrode 173, and a drain electrode 175, is formed on the ohmic contacts 163 and 165 and the gate insulating layer 140.

The data line 171 includes a wide end portion (not illustrated) for connection with another layer or the external driving circuit. The data line 171 transports a data signal and mainly extends in a vertical direction to cross the gate line 121.

In this case, the data line 171 may have a first bent portion having a bent shape in order to obtain maximum transmittance of the liquid crystal display, and a second bent portion that is bent so as to form a predetermined angle with the first bent portion may be further included in the intermediate region of the pixel region. The first and second bent portions may meet each other in an intermediate region of a pixel region to form a V shape.

The source electrode 173 is a portion of the data line 171, and disposed on the same line as the data line 171. The drain electrode 175 is formed to extend in parallel to the source electrode 173. Accordingly, the drain electrode 175 is parallel to a portion of the data line 171.

The gate electrode 124, the source electrode 173, and the drain electrode 175 form one thin film transistor ("TFT") together with the semiconductor layer 154, and a channel of the thin film transistor is formed in a portion of the semiconductor layer 154 between the source electrode 173 and the drain electrode 175.

In an exemplary embodiment, the liquid crystal display may include the source electrode 173 positioned on the same line as the data line 171 with the drain electrode 175 extending in parallel to the data line 171 in order to increase a width of the thin film transistor while an area occupied by the data conductor is not increased, and thus an aperture ratio of the liquid crystal display may be increased.

It is preferable that the data line 171 and the drain electrode 175 be made of a refractory metal such as molybdenum, chromium, tantalum, and titanium, or an alloy thereof, and the data line 171 and the drain electrode 175 may have a multilayered structure including a refractory metal layer (not illustrated) and a low resistance conductive layer (not illustrated). Examples of the multilayered structure include a double layer of a chromium or molybdenum (alloy) lower layer and an aluminum (alloy) upper layer, and a triple layer of a molybdenum (alloy) lower layer, an aluminum (alloy) intermediate layer, and a molybdenum (alloy) upper layer.

A first passivation layer 180a is disposed on exposed portions of the data conductors 171, 173, and 175, the gate insulating layer 140, and the semiconductor 154. The first passivation layer 180a may be formed of an organic insulating material, an inorganic insulating material, or the like.

A second passivation layer 180b is formed on the first passivation layer 180a. The second passivation layer 180b may be formed of an organic insulator.

The second passivation layer 180b may be a color filter. In the case where the second passivation layer 180b is the color filter, the second passivation layer 180b may intrinsically display any one of primary colors. Examples of the primary colors include three primary colors such as red, green, or blue, yellow, cyan, magenta, or the like. Although not illustrated in the drawings, the color filter may further include a color filter displaying a mixed color of the primary colors or white in addition to the primary colors. In the case where the second passivation layer 180b is the color filter, a color filter 230 may be omitted in the upper display panel 200 as will be described later.

A common electrode 270 is positioned on the second passivation layer 180b. The common electrode 270 may have a planar shape, may be formed of a board on an entire surface of the substrate 110, and has an opening 138 disposed in a region corresponding to a periphery of the drain electrode 175. That is, the common electrode 270 may have a flat plate shape.

The common electrodes 270 positioned in adjacent pixels may be connected to each other to receive a common voltage having a predetermined size supplied from the outside of a display region.

An insulating layer 180c is positioned on the common electrode 270. The insulating layer 180c may be formed of an organic insulating material, an inorganic insulating material, or the like.

A pixel electrode 191 is positioned on the insulating layer 180c. The pixel electrode 191 includes a curved edge that is almost parallel to the first bent portion and the second bent portion of the data line 171. The pixel electrode 191 has a plurality of cutouts 91, and includes a plurality of branch electrodes 192 positioned between the adjacent cutouts 91.

The pixel electrode 191 is a first field generating electrode or a first electrode, and the common electrode 270 is a second field generating electrode or a second electrode. The pixel electrode 191 and the common electrode 270 may form a horizontal electric field.

A first contact hole 185 is formed in the first passivation layer 180a, the second passivation layer 180b, and the insulating layer 180c, and exposes the drain electrode 175. The pixel electrode 191 is physically and electrically connected to the drain electrode 175 through the contact hole 185 to receive a voltage from the drain electrode 175.

A first alignment layer 11 is formed on the pixel electrode 191 and the insulating layer 180c. The first alignment layer 11 includes a photoreactive material.

In exemplary embodiments, the first alignment layer 11 includes a liquid crystal photoalignment agent a copolymer formed from cyclobutanedianhydride (CBDA). Specifically, the liquid crystal photoalignment agent is a copolymer formed by a polymerization reaction between cyclobutanedianhydride (CBDA) represented by the following Chemical Formula 1, a flexible group represented by the following Chemical Formula 2, and diamine.

Chemical Formula 1

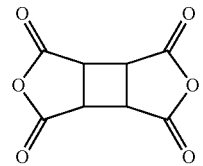

Chemical Formula 2

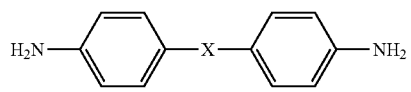

Herein, X of Chemical Formula 2 is a structure including an alkyl chain represented by —(CH2)m-O—(CH$_2$)$_n$—.

In Chemical Formula 2, it is preferable that a sum of m and n is an odd number, or the sum of m, n and the number of oxygen atoms be an even number, but the sums are not limited thereto.

In Chemical Formula 2, the total number of carbon (C) atoms in the alkyl chain represented by X may be 1 to 10, and in exemplary embodiments, the number of carbon atoms is 5, but the number of carbon atoms is not limited thereto. As an example of combination performed so that the number of carbon (C) atoms is 5, m may be 3 and n may be 2.

In the case of the liquid crystal photoalignment agent to which a compound of Chemical Formula 2 is not added, the liquid crystal photoalignment agent has a rigid property, and thus when the photoalignment layer is manufactured by curing the liquid crystal photoalignment agent, anisotropy or decomposition efficiency of the photoalignment layer may be low.

Accordingly, the flexibility of the liquid crystal photoalignment agent may be increased by adding the compound of Chemical Formula 2 which has flexibility in a predetermined amount, and thus anisotropy and decomposition efficiency of the liquid crystal photoalignment agent may be increased as compared to the liquid crystal photoalignment agent where the compound of Chemical Formula 2 is not added.

The compound of Chemical Formula 2 may be present in an amount of about 1% to about 50%, specifically, the about 1% to about 10%, and more specifically about 10% by weight based on the total weight of the liquid crystal photoalignment agent, but is not limited thereto.

When the compound of Chemical Formula 2 is added in an amount of 1% or less, the flexibility of the liquid crystal photoalignment agent is not sufficiently revealed, and thus an effect may be insignificant. When the compound is added in an amount of 50% or more, the flexibility of the liquid crystal photoalignment agent is excessively increased, and thus the ability of the alignment layer to effectively align liquid crystals may be reduced, and subsequently, there is an increased probability of deformation of the alignment layer, and an afterimage may be formed according to deformation.

In an exemplary embodiment, the diamine may include at least one of an aromatic diamine such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenylether, 2,2'-diaminodiphenylpropane, bis(3,5-diethyl-4-aminophenyl)methane, diaminodiphenylsulfone, diaminobenzophenon, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxyl)phenyl]propane, 2,2-bis(4-aminophenyl)hexafluoropropane, and 2,2-bis[4-(4-aminophenoxyl)phenyl]hexafluoropropane, a cycloaliphatic diamine such as bis(4-aminocyclohexyl)methane and bis(4-amino-3-methylcyclohexyl)methane, and an aliphatic diamine such as tetramethylenediamine and hexamethylenediamine, or the like. However, the diamine is not limited thereto.

In an exemplary embodiment, the liquid crystal photoalignment agent copolymer may include repeating units represented by the following Chemical Formula 3 and Chemical Formula 4. The repeating units are randomly repeated in the copolymer.

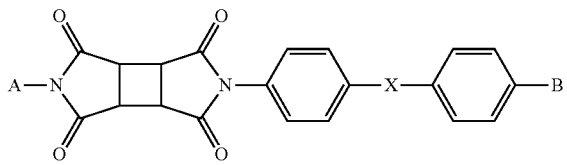

Chemical Formula 3

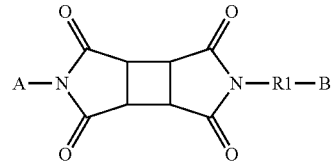

Chemical Formula 4

In Chemical Formula 3 and Chemical Formula 4, A and B represent Chemical Formula 3 or Chemical Formula 4, and R1 is a core structure bonded to two amino groups (—NH$_2$) of the aforementioned diamine.

Herein, X in Chemical Formula 3 is an alkyl chain constituted by —(CH2)m-O—(CH$_2$)$_n$—. In Chemical Formula 3, a sum of m and n is an odd number or the sum of m and n including the number of oxygen atoms be an even number, but the sums are not limited thereto.

In Chemical Formula 3, the total number of carbon (C) atoms in the alkyl chain of X may be 1 to 10. In an exemplary embodiment, the number of carbon atoms is 5, but the number of carbon atoms is not limited thereto. As an example of combination performed so that the number of carbon (C) atoms is 5, m may be 3 and n may be 2.

The ratio of the repeating units of Chemical Formula 3 and Chemical Formula 4 may be 1:99 to 50:50, specifically the ratio may be 10:90, but the ratio is not limited thereto. The degree of anisotropy and decomposition efficiency of the liquid crystal photoalignment agent may be controlled according to the ratio of Chemical Formula 3 and Chemical Formula 4.

Hereinafter, a method of forming the alignment layer will be described with reference to FIGS. 3 to 9.

Figure 3:
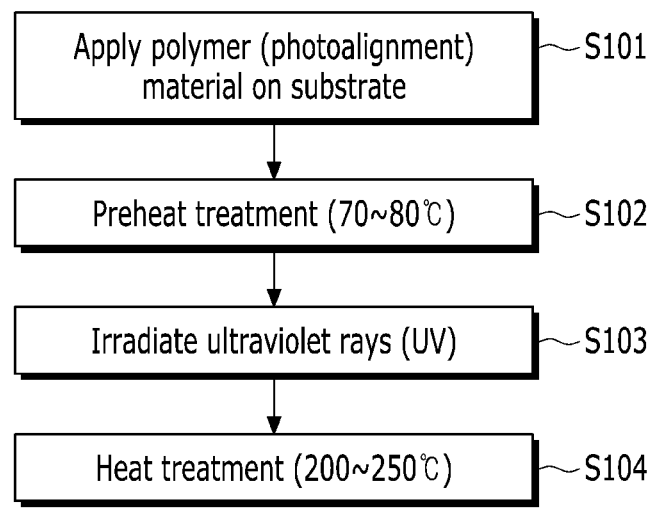
FIG. 3 is a flowchart illustrating an exemplary embodiment of a method of forming a photoalignment layer.

FIG. 3 is a flowchart of an exemplary embodiment of the method of forming the photoalignment layer, and FIGS. 4 to 9 are views further illustrating the exemplary method of forming the photoalignment layer.

First, referring to FIG. 3, the exemplary method of manufacturing the photoalignment layer includes applying a polymer material (photoalignment material) on a substrate (S101), preheat-treating the polymer material applied on the substrate at a temperature of about 70 to about 80 degrees Celsius (° C.) (S102), irradiating ultraviolet rays ("UV") on the preheat-treated polymer material (S103), and heat-treating the polymer material on which the ultraviolet rays have been irradiated (S104). Each step is described in additional detail below.

Figure 4:
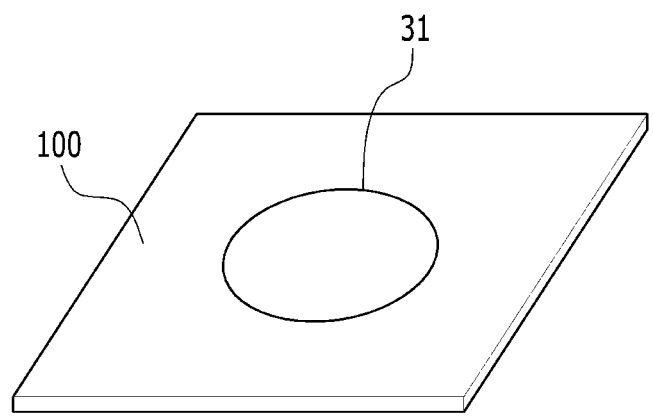
FIG. 4 is an illustration of polymer application step (S101) of the exemplary method of forming the photoalignment layer of FIG. 3.

Referring to FIG. 4, a liquid crystal photoalignment agent 31 (also referred to as "photoalignment agent") including a copolymer formed by polymerizing cyclobutanedianhydride (CBDA), the flexible group represented by Chemical Formula 2, and diamine is applied on the lower display panel 100. The photoalignment agent 31 may be applied by a method such as spin coating, and the photoalignment agent 31 includes a photoreactive material and a solvent.

In exemplary embodiments, the solvent may be an organic solvent. The organic solvent may include at least one of cyclopentanol; a halogen-based solvent such as 1-chlorobutane, chlorobenzene, 1,1-dichloroethane, 1,2-dichloroethane, chloroform, and 1,1,2,2-tetrachloroethane; an ether-based solvent such as diethyl ether, tetrahydrofuran, and 1,4-dioxane; a ketone-based solvent such as methyl ethyl ketone ("MEK"), acetone, and cyclohexanone; an acetate-based solvent such as propylene glycol monomethyl ether acetate ("PGMEA"); an ester-based solvent such as ethyl acetate; an acetate-based solvent such as γ-butyrolactone; a lactone-based solvent such as an ester-based solvent such as ethyl acetate; a carbonate-based solvent such as ethylene carbonate and propylene carbonate; an amine-based solvent such as triethylamine and pyridine; a nitrile-based solvent such as acetonitrile; an amide-based solvent such as N,N'-dimethyl formamide ("DMF"), N,N'-dimethyl acetamide ("DMAc"), tetramethylurea, and N-methylpyrrolidone ("NMP"); a nitro-based solvent such as nitromethane and nitrobenzene; a sulfide-based solvent such as dimethyl sulfoxide ("DMSO") and sulfolane; and a phosphate-based solvent such as hexamethylphosphoric amide and tri-n-butyl phosphate. One or more of the above-mentioned solvents may be used.

Figure 5:
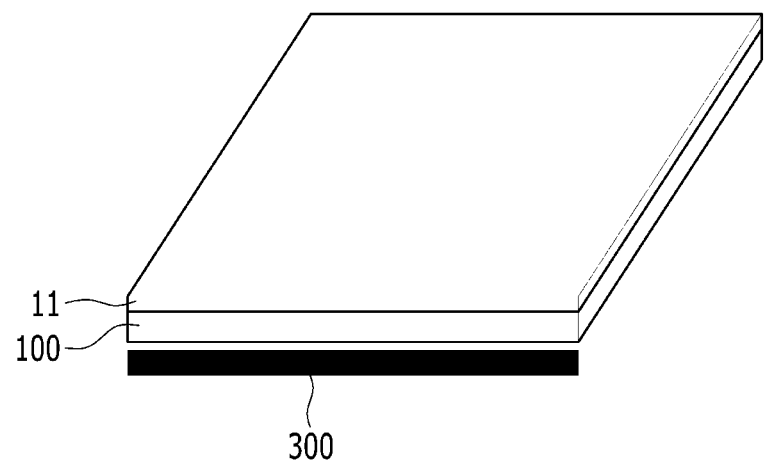
FIG. 5 is an illustration of the prebaking step (S102) of the exemplary method of forming the photoalignment layer of FIG. 3

Referring to FIG. 5, the photoalignment agent 31 is subjected to a preheat treatment in which the photoalignment agent is baked using a heating source 300. Thus, the solvent may be removed, and the photoalignment layer 11 may be formed. This step is called a preheat treatment or a pre-baking step. The pre-baking may be performed by applying heat at a temperature of about 70 to about 80° C. for time of about 60 to about 80 seconds.

Herein, the pre-baking step may be performed through two steps of pre-baking and hard baking.

Figure 6:
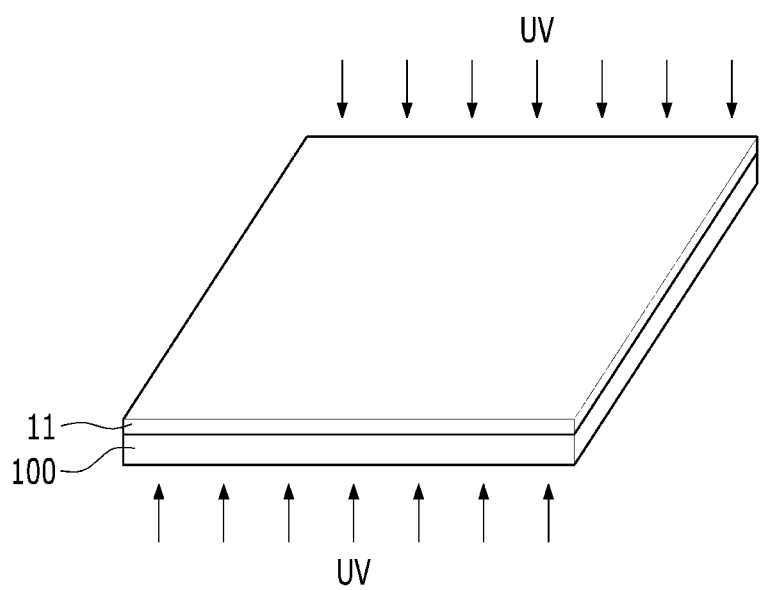
FIG. 6 is an illustration of the irradiation step (S103) of the exemplary method of forming the photoalignment layer of FIG. 3.

Referring to FIG. 6, the first alignment layer 11 may be formed by irradiating polarized light such as ultraviolet rays (UV) on one surface or both surfaces of the photoalignment layer 11. In this case, ultraviolet rays having a wavelength of 240 nanometers (nm) to 380 nanometers may be used. Specifically, ultraviolet rays having a wavelength of 254 nanometers may be used.

Herein, a process of changing a structure of the first alignment layer 11 by irradiating light on the first alignment layer 11 of the present invention will be briefly described.

Figure 7:
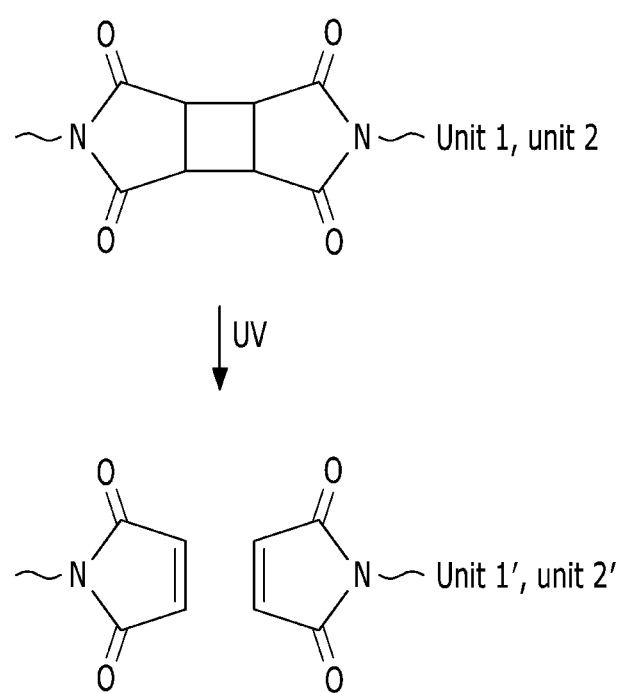
FIG. 7 is structure-based formula showing the decomposition and realignment of polyimide in an exemplary alignment layer.
Figure 8:
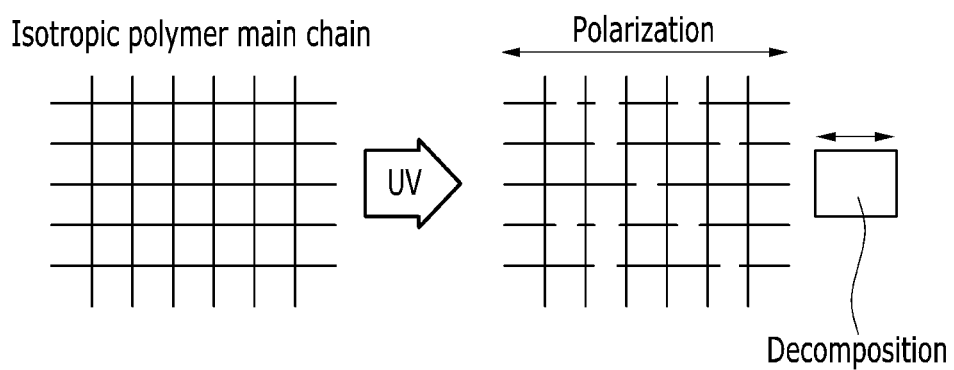
FIG. 8 is an illustration showing a change from isotropy to anisotropy in the exemplary alignment layer.

FIG. 7 is a structure-based formula illustrating the decomposition of polyimide in the exemplary alignment layer. FIG. 8 is a view illustrating a process of changing from isotropy into anisotropy in the exemplary alignment layer.

Referring to FIG. 7, through the exemplary baking process described herein, copolymer including polyimides (Unit 1, Unit 2 represent Chemical Formula 3 and Chemical Formula 4, are formed by performing the polymerization reaction of cyclobutanedianhydride (CBDA), the flexible group represented by Chemical Formula 2, and diamine. When UV is irradiated on the polyimides, the polyimides represented by Chemical Formula 3 and Chemical Formula 4 form maleimides (Unit 1', Unit 2').

FIG. 8 illustrates that a polymer main chain including the polyimide (Unit 1, Unit 2) illustrated in FIG. 7 is decomposed to be aligned as the result of irradiation of the polyimide (Unit 1, Unit 2) with polarized UV. Referring to FIG. 8, if polarized UV is irradiated on an isotropic polymer main chain, photodecomposition occurs in a polarization direction (e.g. an absorption axis direction), and thus the photoalignment layer may be aligned in a direction that is vertical to polarization. If an exposure amount is excessively small, the decomposition efficiency is low, and the alignment property may deteriorate. On the contrary, if the exposure amount is excessively increased, the decomposition efficiency is increased, and decomposition occurs in another direction in addition to the polarization direction, and thus the alignment property may deteriorate.

Figure 9:
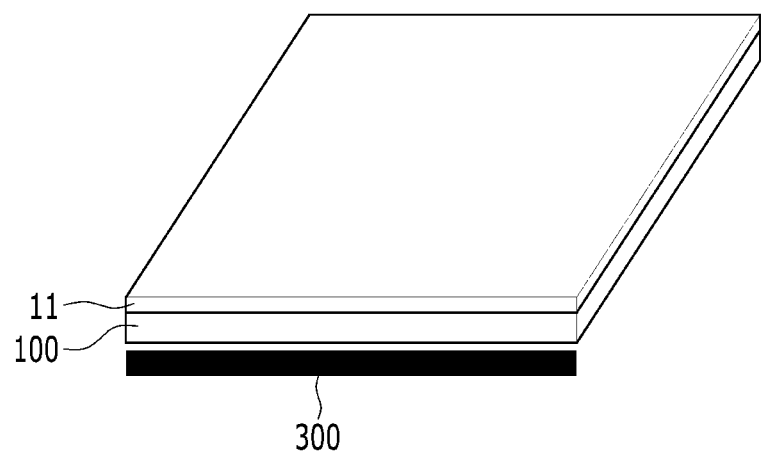
FIG. 9 is an illustration of the heat treatment step (S104) of the exemplary method of forming the photoalignment layer of FIG. 3.

Next, referring to FIG. 9, the first alignment layer 11 is heat-treated by using the heating source 300, and thus the alignment properties of the alignment layer may be further increased by reorienting the entire polymer.

Hereinafter, the upper display panel 200 will be described.

A light blocking member 220 is formed on a second substrate 210 made of transparent glass, plastic, or the like. The light blocking member 220 is called a black matrix and prevents a light leakage.

Further, a plurality of color filters 230 are formed on the second substrate 210. In the case where the second passivation layer 180b of the lower display panel 100 is the color filter, the color filter 230 of the upper display panel 200 may be omitted. Further, the light blocking member 220 of the upper display panel 200 may also be formed in the lower display panel 100.

An overcoat 250 is formed on the color filter 230 and the light blocking member 220. The overcoat 250 may be made of an (organic) insulator, and prevents exposure of the color filter 230 and provides a flat surface. The overcoat 250 may be omitted.

A second alignment layer 21 is formed on the overcoat 250. The second alignment layer 21 includes a photoreactive material. The second alignment layer 21 may be formed of the same material as the first alignment layer 11 by the same method as the first alignment layer 11.

The liquid crystal layer 3 may include a liquid crystal material having positive dielectric anisotropy.

Liquid crystal molecules of the liquid crystal layer 3 are arranged so that a long axis direction thereof is parallel to the display panels 100 and 200.

The pixel electrode 191 receives a data voltage from the drain electrode 175, and the common electrode 270 receives a common voltage having a predetermined size from a common voltage application portion disposed in the outside of the display region.

The liquid crystal molecules of the liquid crystal layer 3 positioned on the pixel electrode 191 and the common electrode 270 are rotated in a direction that is parallel to a direction of an electric field by generating the electric field by the pixel electrode 191 and the common electrode 270, where the pixel electrode 191 and the common electrode 270 are field generating electrodes. Polarization of light passing through the liquid crystal layer is changed according to the aforementioned determined rotation direction of the liquid crystal molecules.

Transmittance of the liquid crystal display may be increased and a wide viewing angle may be implemented by forming the two field generating electrodes, the pixel electrode 191 and the common electrode 270, on one display panel 100.

According to an exemplary embodiment, the common electrode 270 has a surface type planar shape and the pixel electrode 191 has a plurality of branch electrodes. In another exemplary embodiment, the pixel electrode 191 may have the surface type planar shape and the common electrode 270 may have the plurality of branch electrodes.

The present invention can be applied to all other cases where two field generating electrodes overlap with each other on the first substrate 110 while the insulating layer is interposed therebetween, the first field generating electrode formed beneath the insulating layer has a surface type planar shape, and the second field generating electrode formed on the insulating layer has the plurality of branch electrodes.

In order to measure an improvement effect of anisotropy of the exemplary liquid crystal photoalignment agent, the exemplary liquid crystal photoalignment agent copolymer including repeating units of Chemical Formula 3 and Chemical Formula 4, was used as an Example, and a liquid crystal photoalignment agent copolymer including only the repeating units of Chemical Formula 4 was used as a Comparative Example to measure anisotropy. In Chemical Formula 3, m was 3 and n was 2, the content of Chemical Formula 3 was 10 wt % based on the total weight of the liquid crystal photoalignment agent, and p-phenylenediamine represented by Chemical Formula 5 was used as the diamine applied to R1. The result thereof is illustrated in FIG. 10.

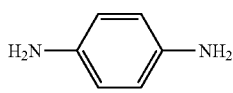

Chemical Formula 5

Figure 10:
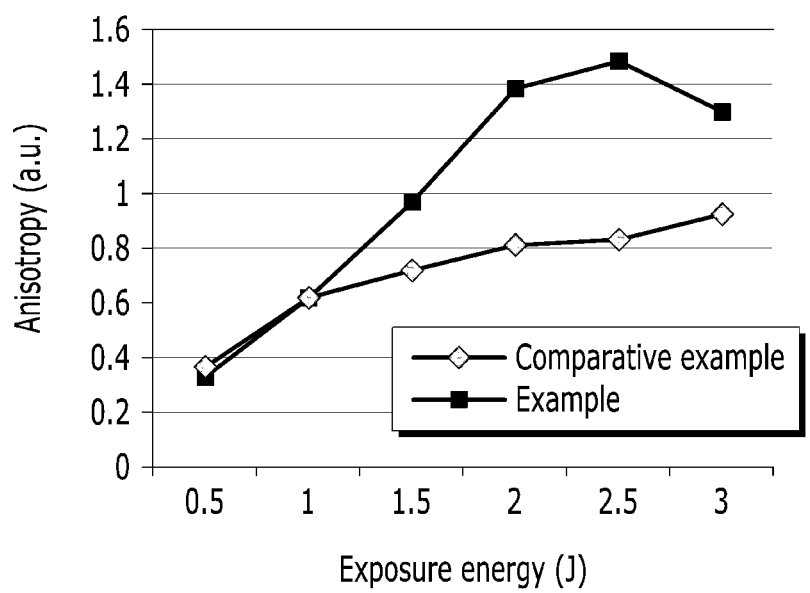
FIG. 10 is a graph illustrating anisotropy versus UV exposure amount for a display device.

FIG. 10 is a graph illustrating the amount of anisotropy versus the UV exposure amount for an alignment layer including the exemplary liquid crystal alignment agent. In FIG. 10, the horizontal axis represents exposure energy as measure in Joules (J), and the vertical axis represents anisotropy.

As illustrated in FIG. 10, where the exemplary liquid crystal photoalignment agent including repeating units of Chemical Formula 3 and Chemical Formula 4 was used (Example), the anisotropy was improved as compared to the liquid crystal photoalignment agent including repeating units of Chemical Formula 4 only, that is, not including Chemical Formula 3 (Comparative Example).

Further, in order to measure an improvement effect of decomposition efficiency of the exemplary liquid crystal photoalignment agent, the aforementioned liquid crystal photoalignment agent where Chemical Formula 3 and Chemical Formula 4 repeat units were included in the copolymer, was used as the Example, and the aforementioned liquid crystal photoalignment agent where only Chemical Formula 4 repeat units were included in the copolymer, was used as the Comparative Example. In Chemical Formula 3, m was 3 and n was 2, the content of Chemical Formula 3 was about 10 wt % based on the total weight of the liquid crystal photoalignment agent, and p-phenylenediamine was used as diamine applied to R1. The result thereof is illustrated in FIG. 11.

Figure 11:
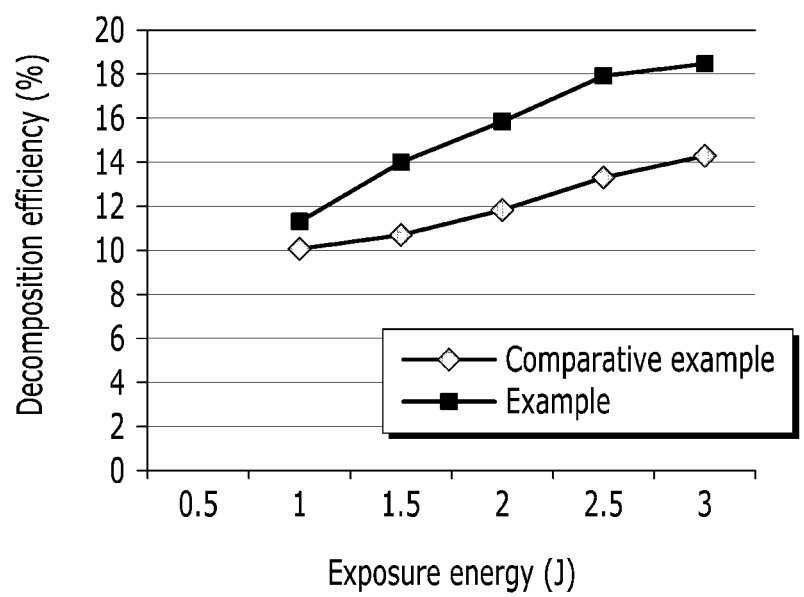
FIG. 11 is a graph illustrating decomposition efficiency versus UV exposure amount for a display device.

FIG. 11 is a graph illustrating decomposition efficiency versus the UV exposure amount in the case where the exemplary liquid crystal alignment agent is used. The horizontal axis represents exposure energy, and a vertical axis represents decomposition efficiency (%).

As illustrated in FIG. 11, where the liquid crystal photoalignment agent copolymer including Chemical Formula 3 was used (Example), decomposition efficiency was improved as compared to the liquid crystal photoalignment agent copolymer not including Chemical Formula 3 (Comparative Example).

As described herein, the liquid crystal display including the exemplary liquid crystal photoalignment agent has a merit in that anisotropy and decomposition efficiency of the liquid crystal photoalignment agent are excellent and as a result, the afterimage can be improved by forming the liquid crystal photoalignment agent using a compound having a flexible structure.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:

a first substrate, a thin film transistor positioned on the first substrate, a first electrode connected to the thin film transistor, a second substrate facing the first substrate, a first alignment layer positioned on the first electrode and a second alignment layer positioned on the second substrate, and a liquid crystal layer positioned between the first substrate and the second substrate and comprising a liquid crystal molecule, wherein at least one of the first alignment layer and the second alignment layer comprises a liquid crystal photoalignment agent, wherein the liquid crystal photoalignment agent comprises a copolymer of cyclobutanedianhydride, a rigid aromatic diamine, and a compound represented by Chemical Formula 2:

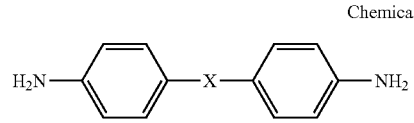

Chemical Formula 2 wherein X represents —(CH2)m-O—(CH$_2$)$_n$—, a sum of m and n is an odd number, m and n are each independently greater than or equal to 1, and a number of carbon atoms in X is an odd number within a range of 5 to 10.

2. The liquid crystal display of claim 1, wherein:

the cyclobutanedianhydride is represented by Chemical Formula 1, and the diamine is p-phenylenediamine represented by Chemical Formula 5:

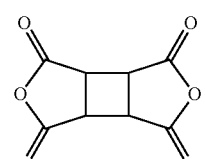

Chemical Formula 1

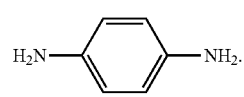

Chemical Formula 5

3. The liquid crystal display of claim 1, wherein: the copolymer comprises repeating units represented by Chemical Formula 3 and Chemical Formula 4, wherein the repeat units are randomly repeated in the copolymer:

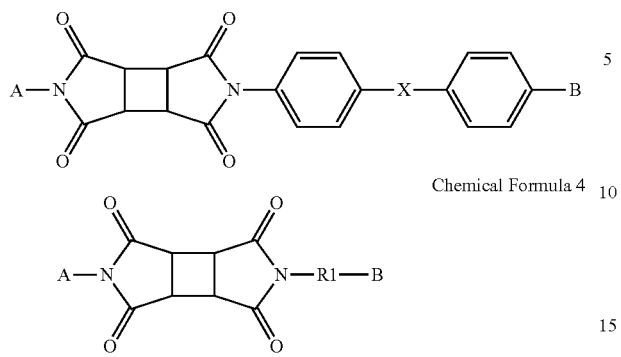

Chemical Formula 3

Chemical Formula 4 wherein X has the same meaning as in Chemical Formula 2, A and B represent Chemical Formula 3 or Chemical Formula 4, and R1 is a core structure bonded to two amino groups of the diamine.

4. The liquid crystal display of claim 1, wherein: the compound of Chemical Formula 2 is present in an amount of about 1% to about 10% based on a total weight of the liquid crystal photoalignment agent.

5. The liquid crystal display of claim 1, further comprising:
a second electrode positioned on the first substrate, and
an insulating layer positioned between the first electrode and the second electrode,
wherein the first electrode includes a plurality of branch electrodes, and the second electrode has a planar shape.

6. The liquid crystal display of claim 5, further comprising: a passivation layer positioned between the thin film transistor and the second electrode,
wherein the thin film transistor and the first electrode are connected via a contact hole defined in the passivation layer and the insulating layer.

7. The liquid crystal display of claim 1, wherein:
the first alignment layer and the second alignment layer include the same material.

8. A method of manufacturing a liquid crystal display, comprising:
forming a thin film transistor on a first substrate,
forming a passivation layer on the thin film transistor,
forming a first electrode and a second electrode on the passivation layer, and an insulating layer positioned between the first electrode and the second electrode,
applying a liquid crystal photoalignment agent on the first electrode or the second electrode,
baking the applied photoalignment agent, and
irradiating polarized light on the photoalignment agent to form a first alignment layer, in forming the liquid crystal display,
wherein the liquid crystal photoalignment agent comprises a copolymer formed by polymerizing cyclobutanedianhydride, a rigid aromatic diamine, and a compound represented by Chemical Formula 2:

Chemical Formula 2

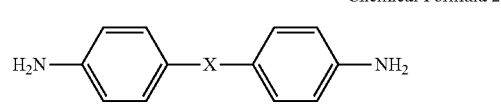

wherein X represents —(CH2)m-O—(CH$_2$)$_n$—, a sum of m and n is an odd number, m and n are each independently greater than or equal to 1, and a number of carbon atoms in X is an odd number within a range of 5 to 10.

9. The method of claim 8, further comprising: applying the liquid crystal photoalignment agent on a second substrate facing the first substrate,
baking the liquid crystal photoalignment agent applied on the second substrate, and
irradiating the liquid crystal photoalignment agent on the second substrate with polarized light to form a second alignment layer.

10. The method of claim 8, further comprising: baking the liquid crystal photoalignment agent after irradiating the liquid crystal photoalignment agent.

11. The method of claim 8, wherein: the copolymer comprises repeating units represented by Chemical Formula 3 and Chemical Formula 4, wherein the repeating units are randomly repeated in the copolymer:

Chemical Formula 3

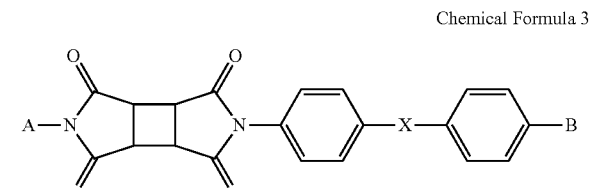

Chemical Formula 4

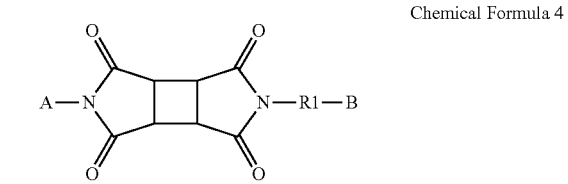

wherein X has the same meaning as in Chemical Formula 2, A and B represent Chemical Formula 3 or Chemical Formula 4, and R1 is a core structure bonded to two amino groups of the diamine.

* * * * *